United States Patent
Iyoda (10) Patent No.: US 7,764,307 B2
(45) Date of Patent: Jul. 27, 2010

(54) REMOTE INSTRUCTION SYSTEM, COMPUTER READABLE MEDIUM FOR REMOTE INSTRUCTION SYSTEM AND METHOD

(75) Inventor: Tetsuo Iyoda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 315 days.

(21) Appl. No.: 11/775,284

(22) Filed: Jul. 10, 2007

(65) Prior Publication Data

US 2008/0018745 A1 Jan. 24, 2008

(30) Foreign Application Priority Data

Jul. 18, 2006 (JP) ............................. 2006-196232
Mar. 8, 2007 (JP) ............................. 2007-059277

(51) Int. Cl.
*H04N 5/232* (2006.01)
*H04N 5/225* (2006.01)

(52) U.S. Cl. ............................ 348/211.12; 348/207.11

(58) Field of Classification Search ............ 348/211.12; 345/650–652, 655, 662, 667, 677, 947; 715/232, 715/247
See application file for complete search history.

(56) References Cited

U.S. PATENT DOCUMENTS

| 6,597,410 B1 * | 7/2003 | Doany et al. ................. 348/744 |
| 6,654,060 B1 * | 11/2003 | Kurosawa et al. ...... 348/333.02 |
| 2004/0070674 A1 * | 4/2004 | Foote et al. ............ 348/207.99 |

FOREIGN PATENT DOCUMENTS

JP 2005-33756 A 2/2005

* cited by examiner

*Primary Examiner*—Sinh Tran
*Assistant Examiner*—Jason A Flohre
(74) *Attorney, Agent, or Firm*—Sughrue Mion, PLLC (57) ABSTRACT

A remote instruction system includes: an imaging unit that captures an image of an object; a projecting unit that projects an annotation image in the imaging area of the imaging unit, the annotation image being formed in accordance with an instruction issued based on the captured image; and an annotation adjusting unit that adjusts the conditions for projecting the annotation image, in accordance with a situation in the imaging area of the imaging unit.

19 Claims, 13 Drawing Sheets

| LOCATION OF DESIGNATED POINT | SIZE AND POSITION OF DRAWING AREA | RECOMMENDED CHARACTER SIZE AND WRITING DIRECTION |
|---|---|---|
| IN AN OBJECT OR IN AN ANNOTATION (AN) IMAGE | A DRAWING AREA IS FORMED IN AN OBJECT OR AN ANNOTATION (AN) IMAGE | POINT 8, HORIZONTAL DIRECTION (HORIZONTAL WRITING) |
| THE DESIGNATED POINT IS IN THE BLANK PORTION, AND NEITHER OBJECTS NOR AN IMAGE EXIST AT A DISTANCE OF 5 TO 100 PIXELS FROM THE DESIGNATED POINT IN THE HORIZONTAL DIRECTION | A DRAWING AREA OF 80 PIXELS IN THE HORIZONTAL DIRECTION AND 14 PIXELS IN THE VERTICAL DIRECTION IS FORMED IN THE BLANK PORTION | POINT 12, HORIZONTAL DIRECTION (HORIZONTAL WRITING) |
| THE DESIGNATED POINT IS IN THE BLANK PORTION, AND NEITHER OBJECTS NOR AN IMAGE EXIST AT A DISTANCE OF 5 TO 100 PIXELS FROM THE DESIGNATED POINT IN THE VERTICAL DIRECTION | A DRAWING AREA OF 80 PIXELS IN THE VERTICAL DIRECTION AND 14 PIXELS IN THE HORIZONTAL DIRECTION IS FORMED IN THE BLANK PORTION | POINT 12, VERTICAL DIRECTION (VERTICAL WRITING) |
| THE DESIGNATED POINT IS IN THE BLANK PORTION, AND AN OBJECT OR AN IMAGE EXISTS AT A DISTANCE OF 5 TO 50 PIXELS FROM THE DESIGNATED POINT IN THE HORIZONTAL DIRECTION | A DRAWING AREA OF 12 PIXELS IN THE LONGITUDINAL DIRECTION AND 40 PIXELS IN THE TRANSVERSE DIRECTION IS FORMED IN THE BLANK PORTION, THE DRAWING AREA HAVING A RECTANGULAR SHAPE EXTENDING PARALLEL TO THE OUTLINE OF AN OBJECT OR AN IMAGE | POINT 10, DIRECTION PARALLEL TO THE OUTLINE (HORIZONTAL WRITING) |
| THE DESIGNATED POINT IS IN THE BLANK PORTION, AND AN OBJECT OR AN IMAGE EXISTS AT A DISTANCE OF 5 TO 50 PIXELS FROM THE DESIGNATED POINT IN THE VERTICAL DIRECTION | A DRAWING AREA OF 40 PIXELS IN THE LONGITUDINAL DIRECTION AND 12 PIXELS IN THE TRANSVERSE DIRECTION IS FORMED IN THE BLANK PORTION, THE DRAWING AREA HAVING A RECTANGULAR SHAPE EXTENDING PARALLEL TO THE OUTLINE OF AN OBJECT OR AN IMAGE | POINT 10, DIRECTION PARALLEL TO THE OUTLINE (VERTICAL WRITING) |

REMOTE INSTRUCTION SYSTEM, COMPUTER READABLE MEDIUM FOR REMOTE INSTRUCTION SYSTEM AND METHOD

CROSS-REFERENCE TO RELATED APPLICATIONS

This application is based on and claims priority under 35 USC 119 from Japanese Patent Application No. 2006-196232 filed Jul. 18, 2006 and Japanese Patent Application No. 2007-059277 filed Mar. 8, 2007.

BACKGROUND

1. Technical Field

The present invention relates to a remote instruction system, a computer readable medium for a remote instruction system and a method.

2. Related Art

In remote repair systems, remote maintenance systems, remote medical care systems, remote conference systems, and the likes, it is necessary to issue various instructions such as operation procedure instructions to an object side from a remote place.

SUMMARY

According to an aspect of the invention, there is provided a remote instruction system that includes: an imaging unit that captures an image of an object; a projecting unit that projects an annotation image in the imaging area of the imaging unit, the annotation image being formed in accordance with an instruction issued based on the captured image; and an annotation adjusting unit that adjusts the conditions for projecting the annotation image, in accordance with a situation in the imaging area of the imaging unit.

BRIEF DESCRIPTION OF THE DRAWINGS

Exemplary embodiment of the present invention will be described in detail based on the following figures, wherein:

FIG. 11 shows an example of table information stored in the memory; and

DETAILED DESCRIPTION

The following is a description of an exemplary embodiment of the present invention, with reference to the accompanying drawings.

Figure 1:
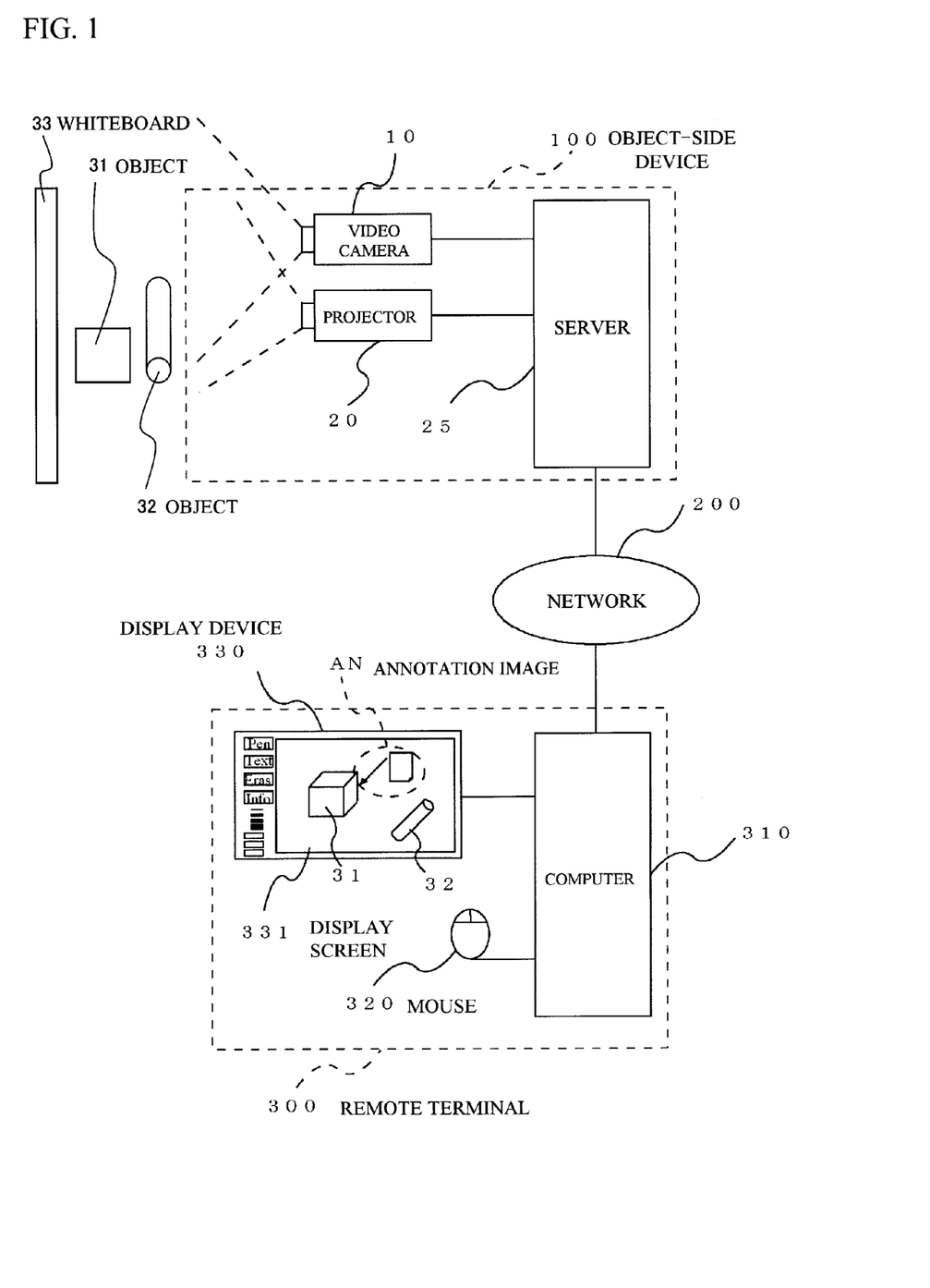
FIG. 1 illustrates the structure of a remote instruction system in accordance with the present invention.
Figure 2:
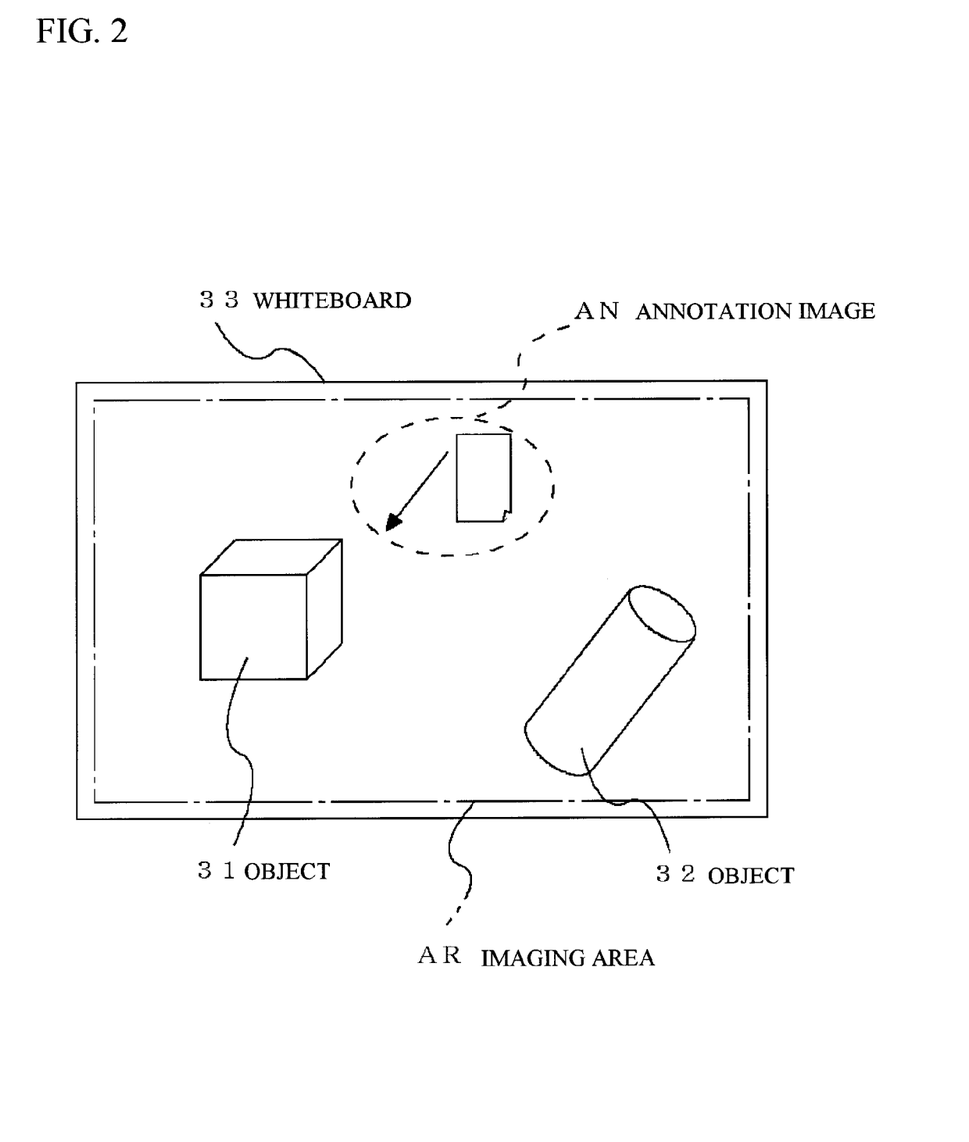
FIG. 2 shows the positional relationship among the objects displayed on a screen.

FIG. 1 illustrates the structure of a remote instruction system in accordance with an exemplary embodiment of the present invention. FIG. 2 shows the positional relationship between the whiteboard and objects.

As shown in FIG. 1, this remote instruction system includes a subject-side device 100, a remote terminal 300, and the likes. The subject-side device 100 and the remote terminals 300 are connected via a network 200. Although only one remote terminal 300 is shown in FIG. 1, two or more remote terminals 300 may be connected to a server 25 (described later) of the subject-side device 100 via the network 200.

The subject-side device 100 includes a video camera 10 as an imaging unit, a projector 20 as a projecting unit, and a server 25 as a controller.

The video camera 10 is formed with a CCD (Charge Coupled Device) camera, for example. The video camera 10 is located in such a position as to capture images of objects 31 and 32 that are set in front of a whiteboard 33. The captured images are read into the server 25. The objects include all things located in the imaging area of the video camera 10.

The projector 20 is adjacent to the video camera 10, and is located so that the angle of view (the field of view) of the projector 20 is substantially the same as the angle of view (the field of view) of the video camera 10. The projector 20 is formed with a liquid crystal projector or the like. A liquid crystal projector or the like is used as the projector 20. The projector 20 can project an annotation image onto any object existing within the field of view (the angle of view) of the video camera 10, not only onto the object 31 or 32. As shown in FIG. 2, the objects 31 and 32 are located within the imaging area AR on the front of the whiteboard 33. However, the video camera 10 also captures an image of the whiteboard 33 as another object, and an annotation image AN can be projected onto the whiteboard 33.

The server 25 controls the operations of the video camera 10 and the projector 20, and also exchanges various kinds of information with the remote terminal 300 over the network 200. The server 25 also transmits images captured by the video camera 10 to the remote terminal 300, and causes the projector 20 to project an annotation image onto the object 31 or 32 or the whiteboard 33 in accordance with an instruction issued from the remote terminal 300 based on a captured image. Each annotation image may include any kinds of images such as lines, characters, symbols, figures, colors, font types (typefaces).

The remote terminal 300 includes a display device 330 that is a liquid crystal display, a CRT display, or the like, a computer 310 connected to the network 200, and a pointing device (a mouse) 320 connected to the computer 310.

The display device 330 displays an image or the like transmitted from the subject-side device 100 on its display screen 331.

Figure 3:
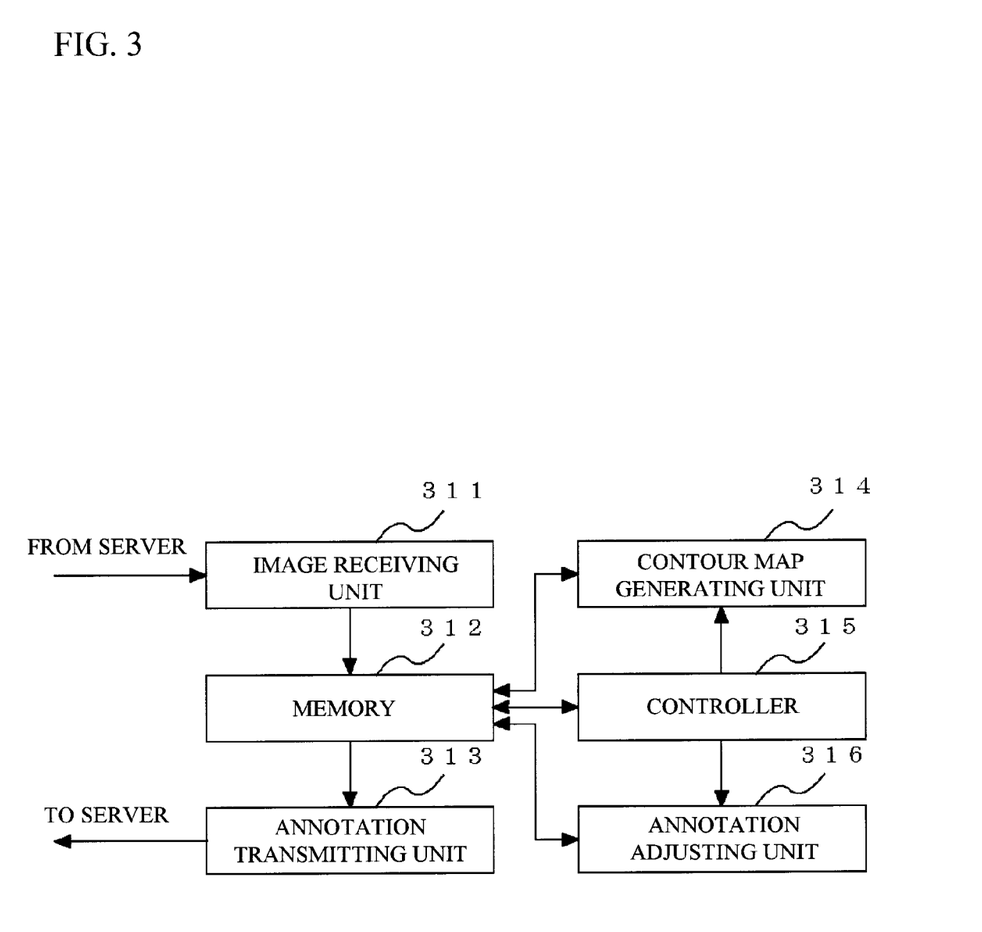
FIG. 3 is a functional block diagram of a remote terminal.

FIG. 3 is a functional block diagram showing the components of the computer 310 of the remote terminal 300. The respective functional blocks shown in FIG. 3 are embodied by a processor such as a CPU, a semiconductor memory device such as a SRAM or DRAM, hardware, and suitable software.

The computer 310 includes an image receiving unit 311, a memory 312, an annotation transmitting unit 313, a contour map generating unit 314, a controller 315, and an annotation adjusting unit 316.

The image receiving unit 311 receives images captured in the imaging area, such as the images of the objects 31 and 32 and the annotation image AN transmitted from the server 25. The image receiving unit 311 stores those images in the memory 312.

The memory 312 stores not only the captured images, but also data such as contour images generated from the contour map generating unit 314, adjusted annotation images generated from the annotation adjusting unit 316, and drawing commands for displaying the annotation images. Hereinafter, the data will be referred to as the annotation data.

The annotation transmitting unit 313 transmits the annotation data to the server 25.

The contour map generating unit 314 generates a contour image from a captured image stored in the memory 312. More specifically, a contour extracting operation (an edge extracting operation) is performed on a captured image extracted from the memory 312, and a contour image is formed. This procedure is carried out every time the image data is updated, and the generated contour image is stored back in the memory 312. The contour map generating unit 314 also stores the coordinate information as to the four corners of the generated contour image in the memory 312, and the coordinate information as to the portions shadowed by objects in the contour image in the memory 312.

The annotation adjusting unit 316 generates the annotation data for adjusting the conditions for displaying an annotation image, based on the contour image stored in the memory 312 and the annotation image that is input to the computer 310. The annotation data for adjusting the display conditions is stored in the memory 312.

The controller 315 collectively controls the memory 312, the contour map generating unit 314, and the annotation adjusting unit 316.

Figure 4:
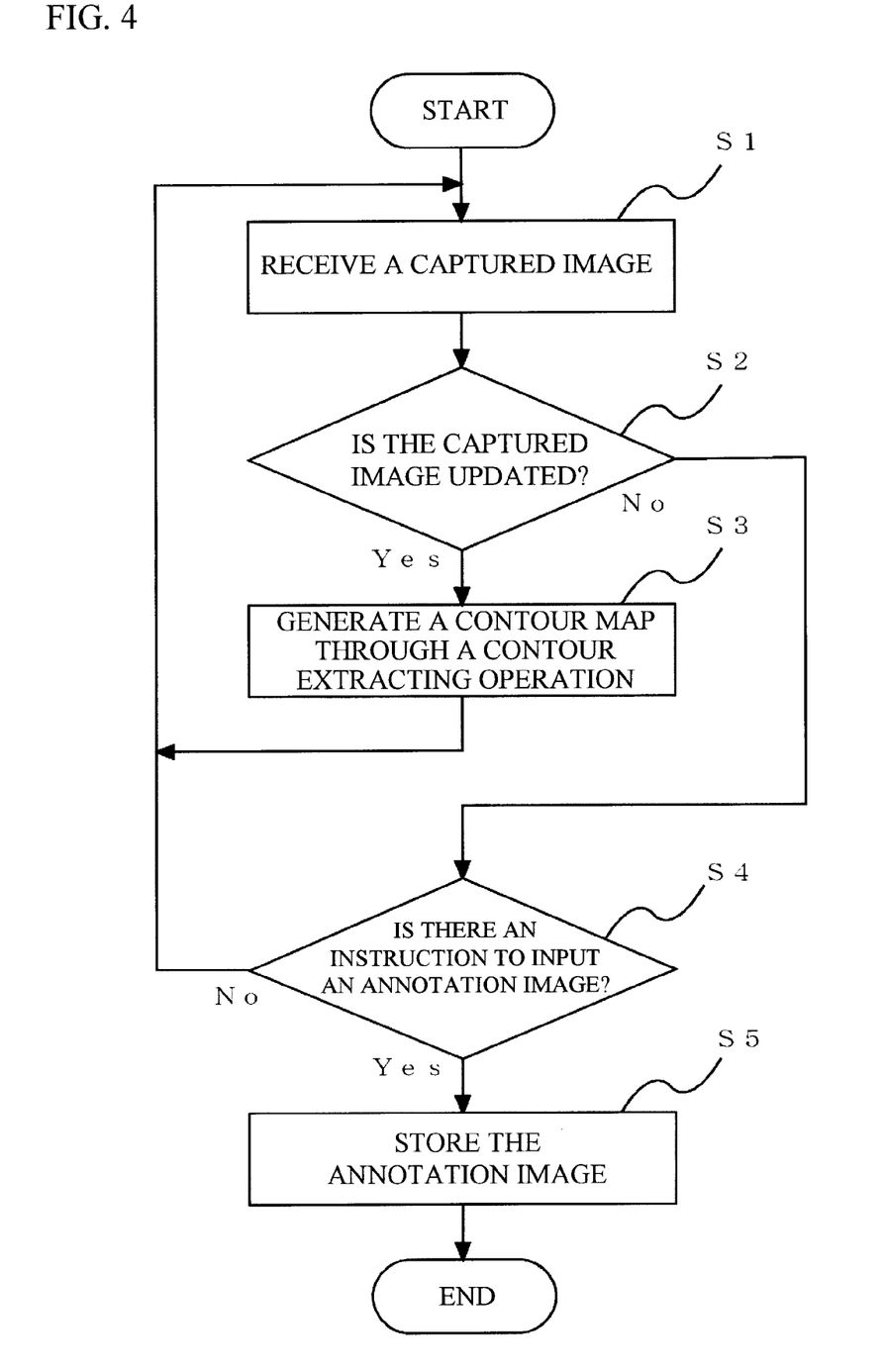
FIG. 4 is a flowchart showing an example operation to be performed by the computer of a remote terminal.
Figure 5A:
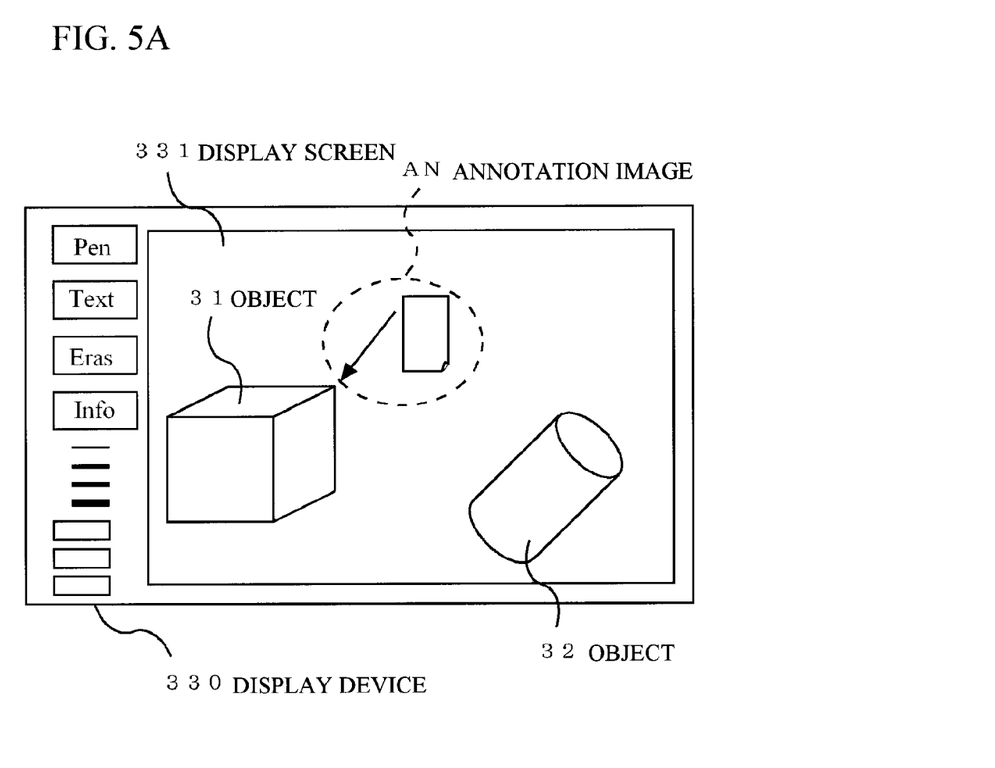
FIGS. 5A and 5B show a display example and a contour image of objects in a display device.
Figure 5B:
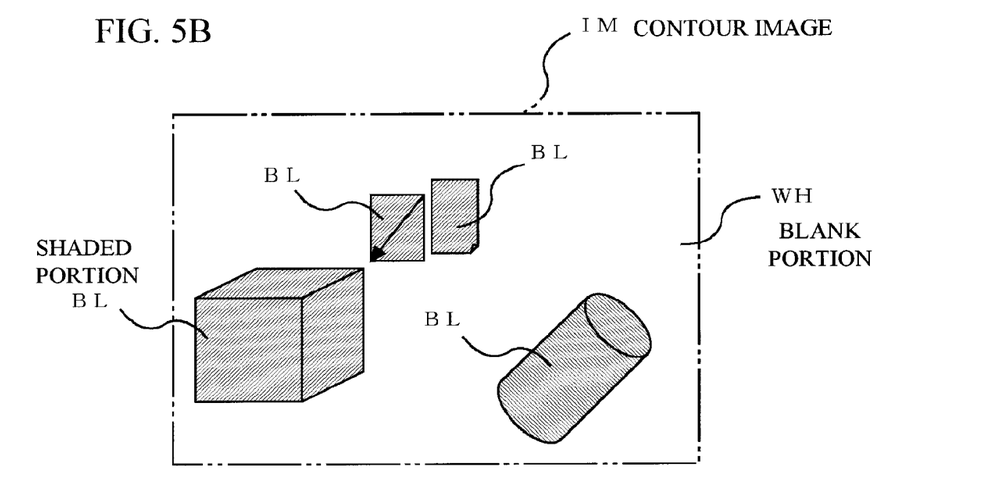

Referring now to FIG. 4 and FIGS. 5A and 5B, a series of operations of the remote instruction system with the above-described structure is described.

FIG. 4 is a flowchart showing an example of a contour image generating operation to be performed by the computer of a remote terminal. FIGS. 5A and 5B illustrate an example case where objects are displayed on the display device, and a contour image in the example case.

First, as shown in FIG. 4, the computer 310 receives captured images of the objects 31 and 32, the annotation image AN, and the likes from the server 25 one by one (step S1). The computer 310 then determines whether the received captured images have been updated (step S2). More specifically, the received captured images are compared with captured images that were received a certain amount of time ago and are already stored in the memory 312. If the received captured images do not match the stored captured images, the received captured images are determined to be updated images.

If the captured images are updated images, a contour extracting operation is performed on the received captured images, so as to generate a contour image (step S3). For example, the display device 330 receives captured images from the computer 310, and displays the objects 31 and 32 and the annotation image AN on the display screen 331, as shown in FIG. 5A. The computer 310 then generates a contour image IM based on the object 31 and the likes displayed on the display screen 331, with the objects 31 and 32 and the annotation image AN being shaded portions PL, and the background portion being a blank portion WH, as shown in FIG. 5B. The coordinate information as to the four corners of the contour image IM, the coordinate information as to the shaded portions BL, and the contour image IM are stored in the memory 312. The display screen 331 has the same size as the contour image IM. Using the common coordinate information as to the display screen 331 and the contour image IM, the annotation adjusting unit 316 of the computer 310 determines the positions and sizes of the shaded portions BL, the blank portion WH, a designated point (described later), and a drawing area (described later). The coordinate information as to the shaded portions BL, the blank portion WH, the designated point, and the drawing area is stored in the memory 312 when appropriate.

After confirming that the contour image IM is stored in the memory 312, the computer 310 continues to receive captured images (step S1).

If the captured images are determined not to be updated images in step S2, the computer 310 determines whether there is an input of an annotation image (step S4). If there is not an input of an annotation image, the computer 310 continues to receive captured images (step S1). If there is an input of an annotation image, the computer 310 stores the annotation image as data (step S5).

Referring now to FIGS. 6A through 10B, an operation of adjusting the conditions for displaying an annotation image is described.

Figure 6A:
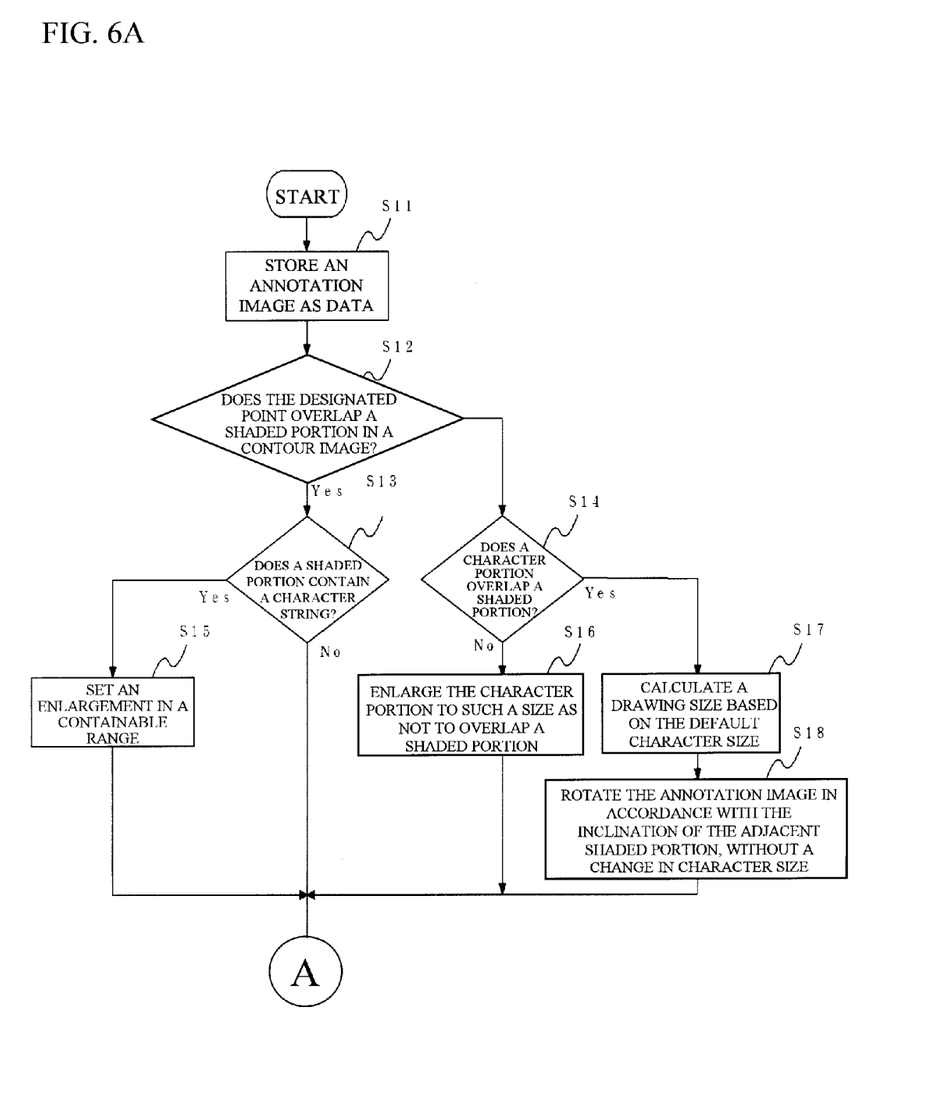
FIGS. 6A and 6B are a flowchart showing an example of an operation to be performed by the computer of a remote terminal.
Figure 6B:
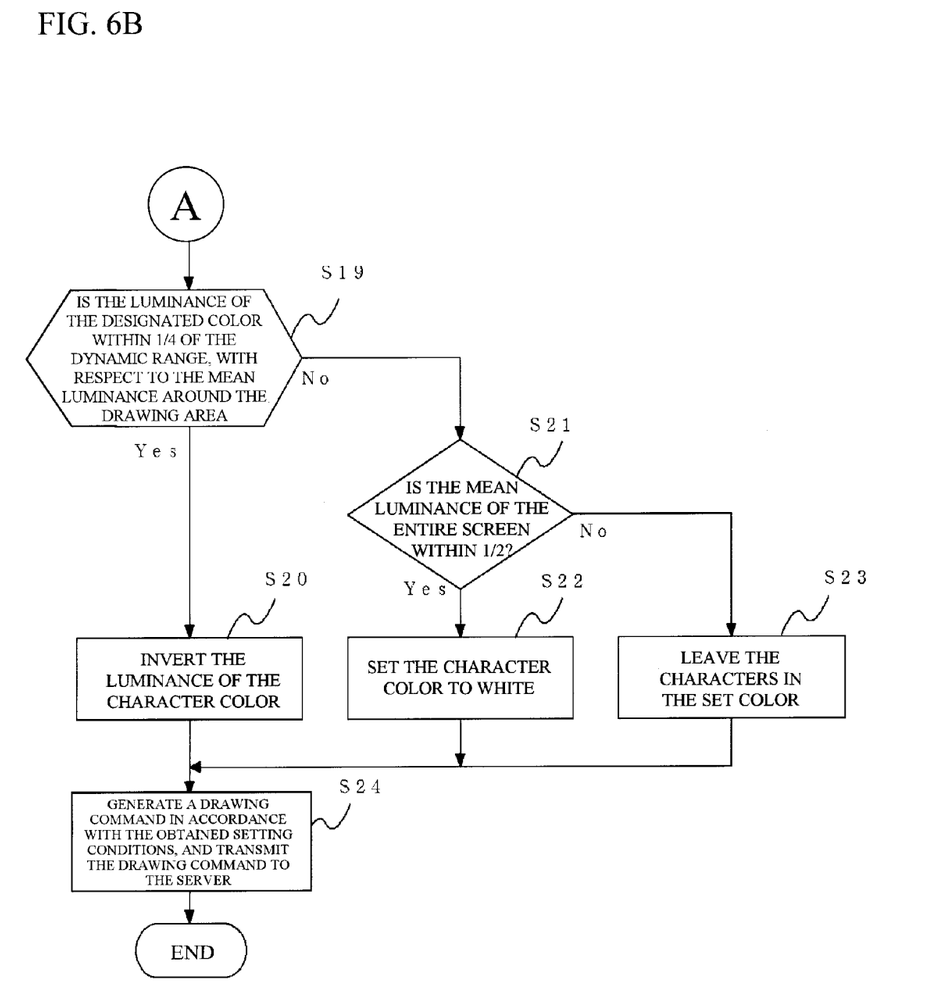
Figure 7A:
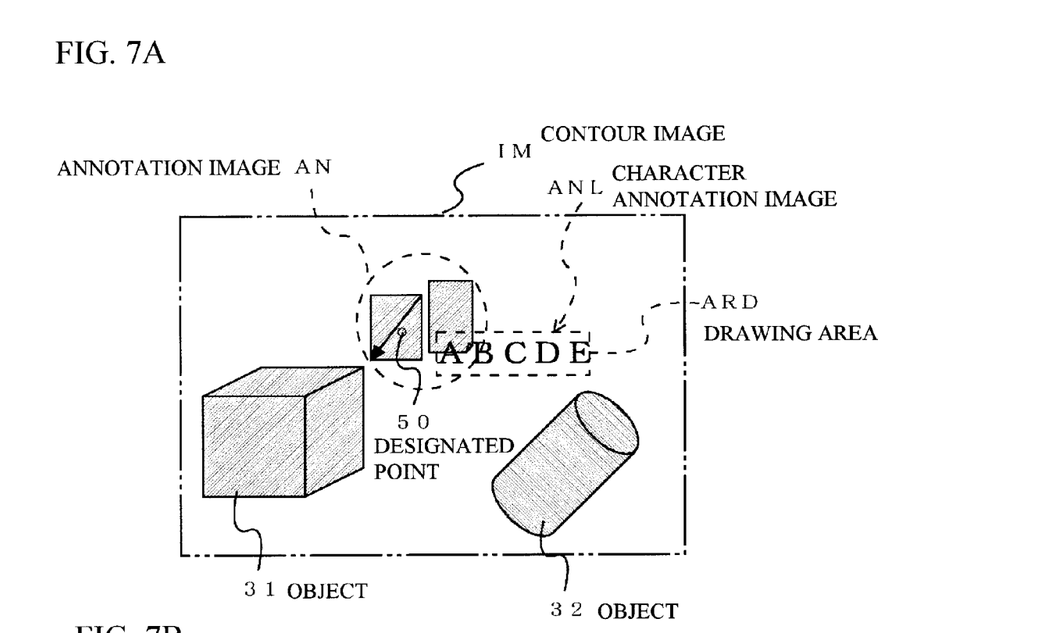
FIGS. 7A and 7B show an example of an annotation image that is not adjusted.
Figure 7B:
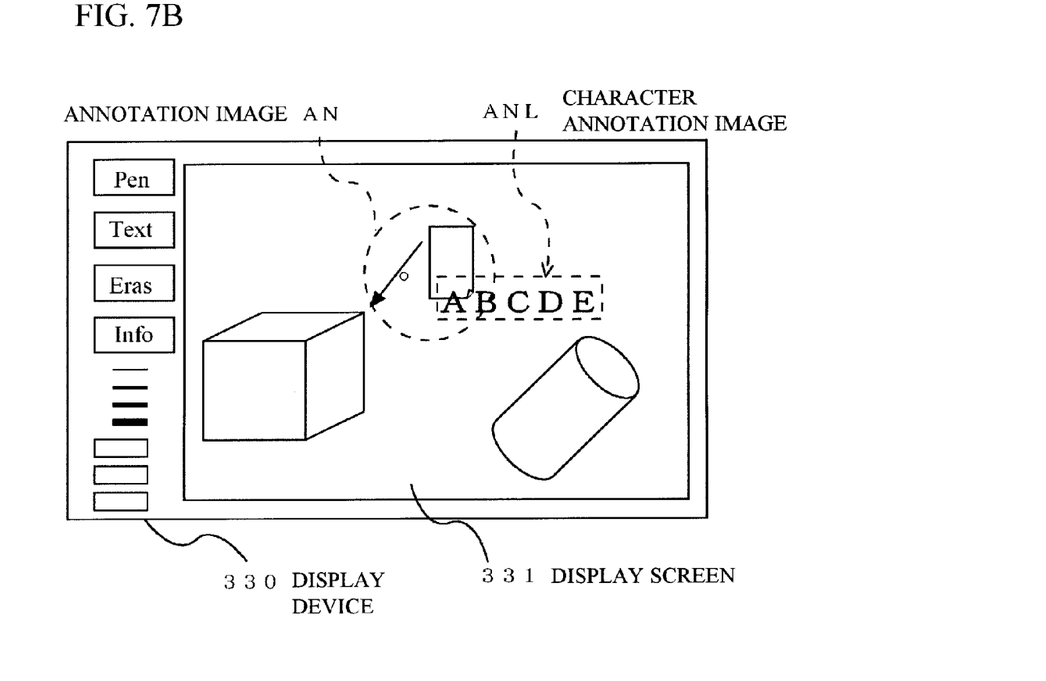

FIGS. 6A and 6B are a flowchart showing an example of an operation to be performed by the computer (or the annotation adjusting unit 316, to be exact) of a remote terminal. FIGS. 7A and 7B illustrate an example of an annotation image that is not adjusted. FIGS. 8A through 10B illustrate an example of an annotation image that is adjusted.

First, the conditions for displaying an annotation image are described.

When the computer 310 obtains the annotation data (step S11), the computer 310 determines whether the shaded portions of the contour image IM overlap a designated position (hereinafter referred to as the designated point) of the drawing area determined by the annotation data (step S12).

The annotation data includes the data for defining the drawing area of characters and the likes displayed (hereinafter referred to as the drawing area data), and the data for defining the display position of the drawing area (hereinafter referred to as the designated point data). More specifically, the drawing area data is the coordinate information for defining the drawing area of characters and the likes to be displayed, and the designated point data is the coordinate information for defining the display position of the drawing area. Accordingly, when the computer 310 displays an annotation image in the form of characters (hereinafter referred to as the character annotation image ANL) on the display screen 331, the computer 310 sets the drawing area in the position designated by the designated point data, and displays the characters displayed in the drawing area on the display screen 331.

For example, in FIG. 7A, a designated point 50 of the character annotation image ANL in the contour image IM overlaps a shaded portion of the annotation image AN. In such a case, the computer 310 detects the position information as to the designated point 50 and the position information as to the shaded portions of the annotation image AN, and, based on the position information, determines that the designated point 50 overlaps the shaded portions of the contour image IM in step S12.

The computer 310 then determines whether the character annotation image ANL is contained in the shaded portions (step S13). For example, in FIG. 7A, the designated point 50 overlaps the shaded portions of the annotation image AN.

However, only a part of the characters displayed in the drawing area ARD overlaps the shaded portions of the annotation image AN, and the rest of the characters is displayed in the blank area. In such a case, the computer 310 determines that the character annotation image ANL is not contained in the housed portions.

Figure 8A:
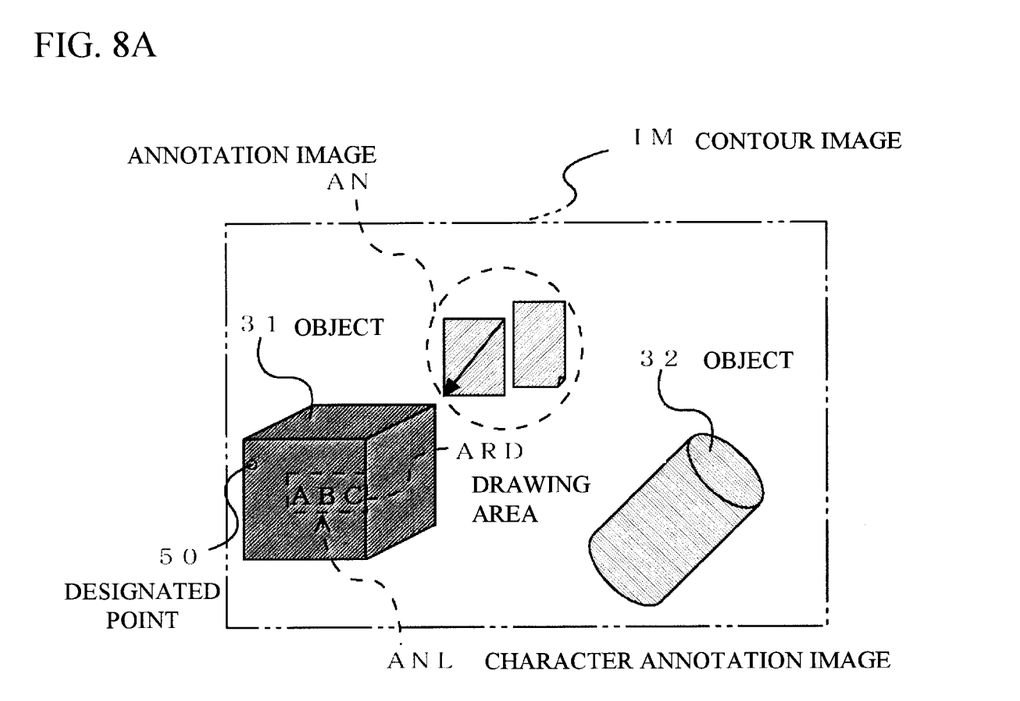
FIGS. 8A and 8B show an example of an annotation image that is adjusted.

Meanwhile, in FIG. 8A, the designated point 50 overlaps the shaded portion of the object 31, and all the characters displayed in the drawing area ARD also overlap the shaded portion of the object 31. In such a case, the computer 310 determines that the character annotation image ANL is included in the shaded portions.

Figure 8B:
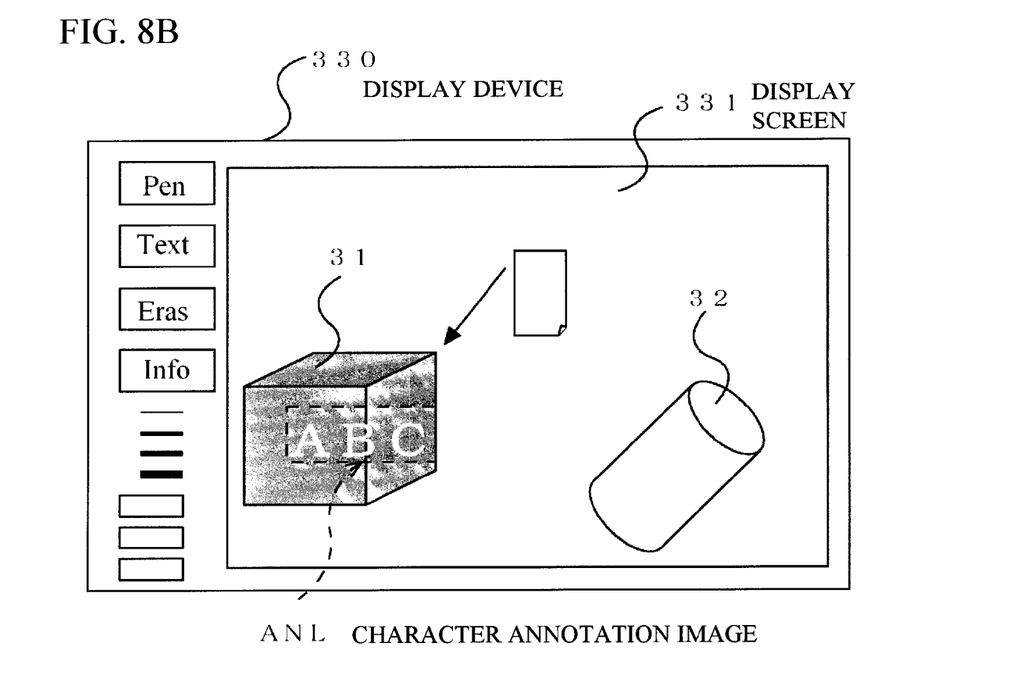

If the character annotation image ANL is included in the shaded portions, the computer 310 increases the size of the character annotation image ANL to the maximum size that can be included in the shaded portion (step S15). For example, in FIG. 8A, the size of the character portion displayed in the drawing area ARD is not as large as the maximum size for the shaded portion of the object 31. However, through the procedure of step S15, the size of the character portion can be increased to the maximum size for the shaded portion of the object 31, as shown in FIG. 8B.

Figure 9A:
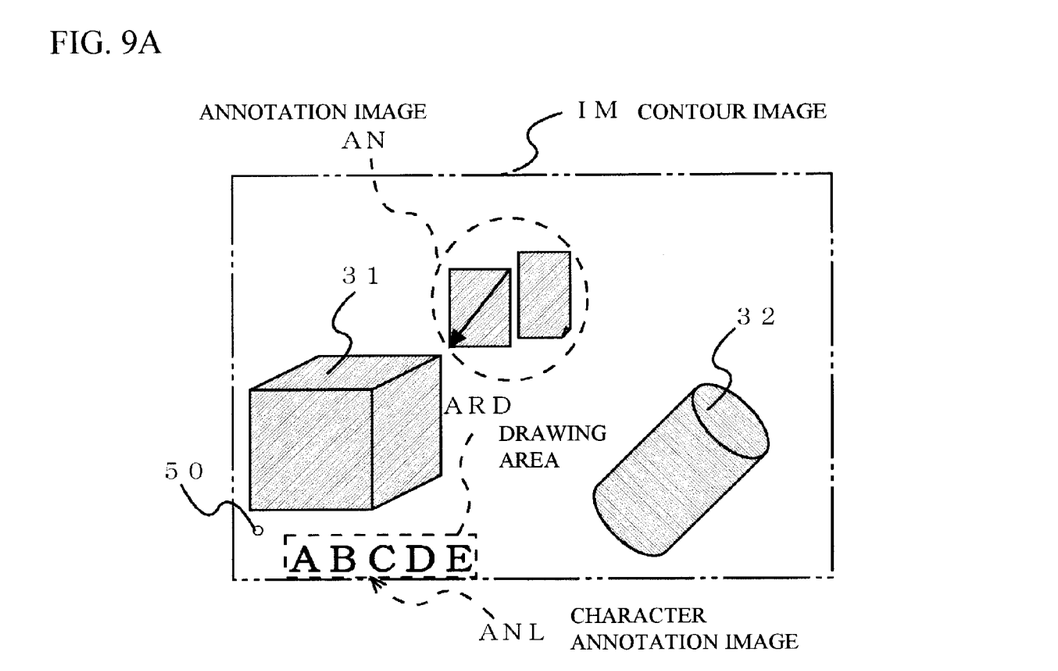
FIGS. 9A and 9B show another example of an annotation image that is adjusted.
Figure 9B:
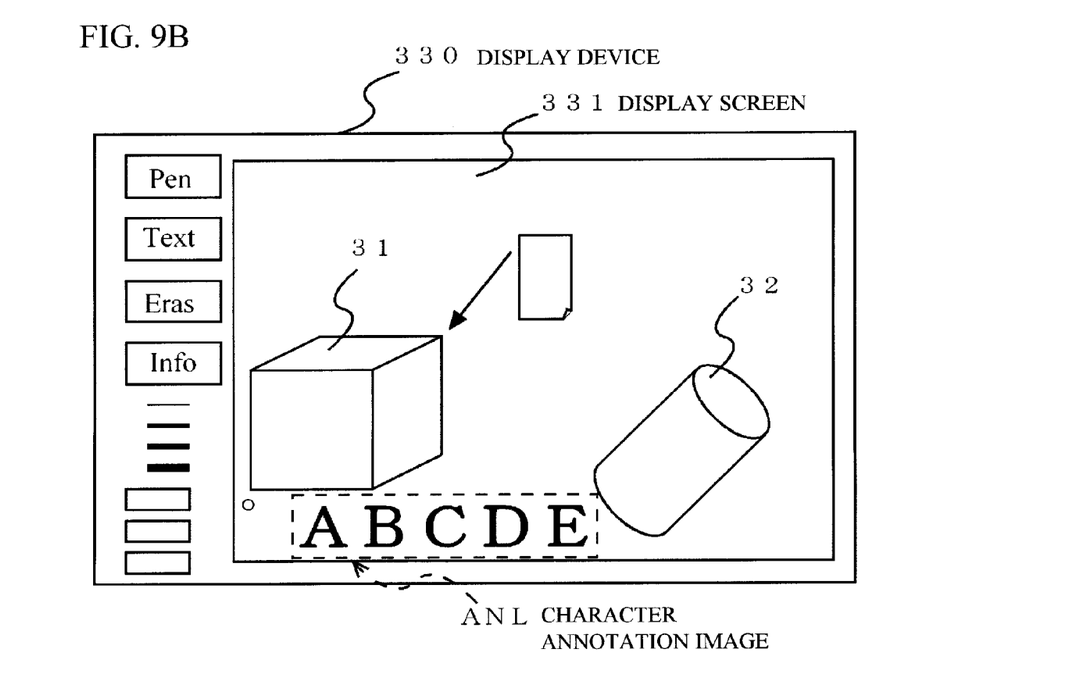

Meanwhile, in a case where the designated point 50 does not overlap the shaded portions in the contour image IM, the computer 310 determines whether the characters displayed in the drawing area ARD overlap the shaded portions in the contour image IM (step S14). For example, in FIG. 9A, the designated point 50 does not overlap any of the shaded portions in the contour image IM, and the characters displayed in the drawing area ARD do not overlap any of the shaded portions in the contour image IM either. In such a case, the size of the character portion is increased to such a size that the characters do not overlap any of the shaded portions in the contour image IM, as shown in FIG. 9B, based on the coordinate information as to the blank portion or the shaded portions and the coordinate information as to the drawing area (step S16).

Figure 10A:
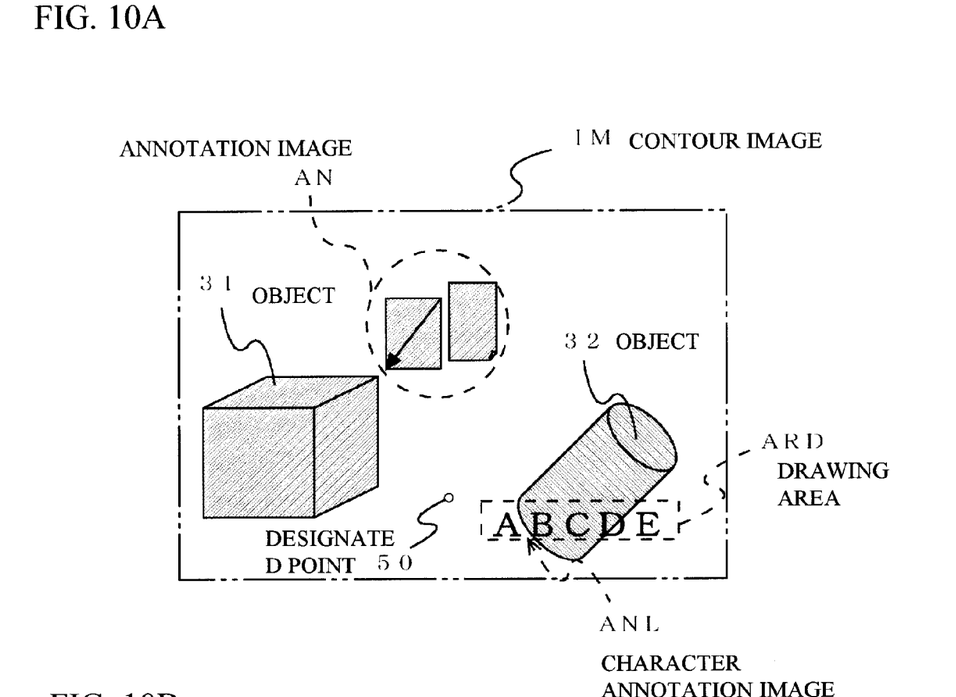
FIGS. 10A and 10B show yet another example of an annotation image that is adjusted.
Figure 10B:
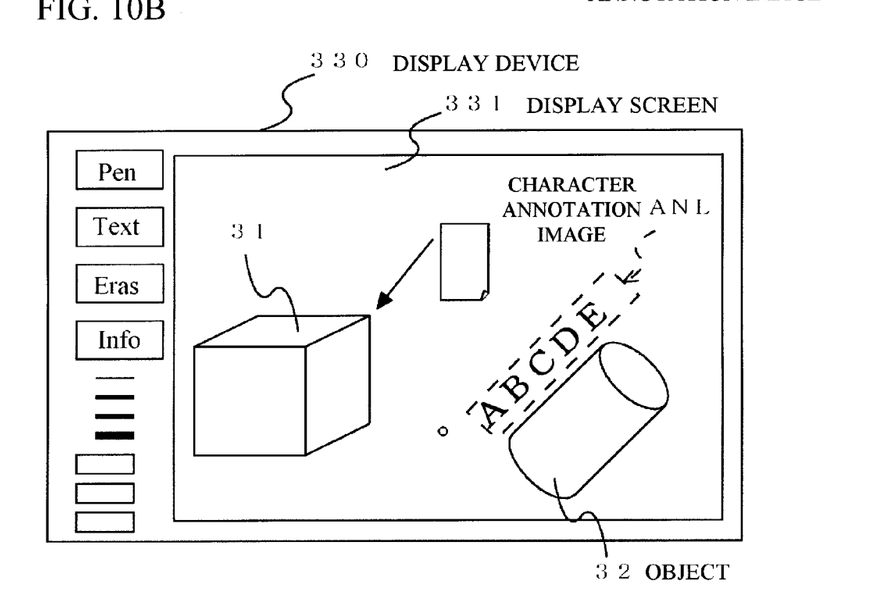

Meanwhile, in FIG. 10A, the designated point 50 does not overlap any of the shaded portions in the contour image IM, but a part of the character portion displayed in the drawing area ARD overlaps the shaded portion of the object 32. In such a case, the computer 310 calculates the drawing size according to the default character size (the initial value set in advance in the remote instruction system) (step S17). Based on the coordinate information as to the shaded portions and the drawing area, the computer 310 calculates the rotation angle of the drawing area ARD, and rotates the drawing area ARD and the character portion displayed therein by the rotation angle about the designated point 50, so that the drawing area ARD is parallel to the longitudinal inclination of the shaded portion of the object 32, which is the closest to the designated point 50, as shown in FIG. 10B.

Next, color adjustment to be performed on an annotation image is described.

The computer 310 determines whether the luminance of the designated color of the characters is within ¼ of the dynamic range with respect to the mean luminance of the images around the drawing area (step S19). For example, the mean luminance of the surrounding images may be represented by the color of the object 31, as shown in FIG. 8A. If the luminance of the color of the object 31 is equal to or ¼ of the dynamic range (the range of the concentration values of the images) when the color of the characters displayed in the drawing area ARD is compared with the color of the object 31, the computer 310 determines that the color of the characters is similar to the color of the object 31, and inverts the luminance of the characters, as shown in FIG. 8B (step S20).

Meanwhile, if the luminance of the designated color of the characters is not within ¼ of the dynamic range with respect to the mean luminance of the images around the drawing area, the computer 310 determines whether the mean luminance of the entire captured image is within ½ (step S21). If the entire captured image is dark, characters in a dark color such as black are not visible on the display screen 331, and therefore, the characters are set in white (step S22). If the mean luminance of the entire captured image is not within ½, the computer 310 sets the characters in the default color (step S23).

As described above, the computer 310 generates a character drawing command based on the annotation data indicating the display conditions and display color of the character annotation image ANL, and transmits the character drawing command to the server 25 (step S24). Upon receipt of the character drawing command having the display conditions and the likes adjusted, the server 25 causes the projector 20 to project an annotation image.

In the operation of FIGS. 6A and 6B to be performed by the computer of a remote terminal, when annotation data (the drawing area data and the designated point data) are obtained, the character size and the character position are automatically determined in accordance with the positional relationship between the designated position of the drawing area (the designated point) and the shaded portions of the contour image IM (steps S12 through S18). Alternatively, when obtaining the designated point data (or the coordinate information as to the designated point 50), the computer 310 may display characters of a recommended character size (such as point 8, point 10, point 12) or in a recommended writing direction (such as a vertical direction, a horizontal direction, or a direction parallel to the outline of an object) in a drawing area with a text frame or the like on the display device 330. The display position and size of the drawing area, the character size, and the writing direction are adjusted by the annotation adjusting unit 316, based on the table information stored in the memory 312.

FIG. 11 shows an example of table information stored in the memory 312. In FIG. 11, the size and position of the drawing area can be changed in accordance with the number and size of characters to be drawn. Further, the table information may include only either the recommended character size or the recommended writing direction.

Figure 12A:
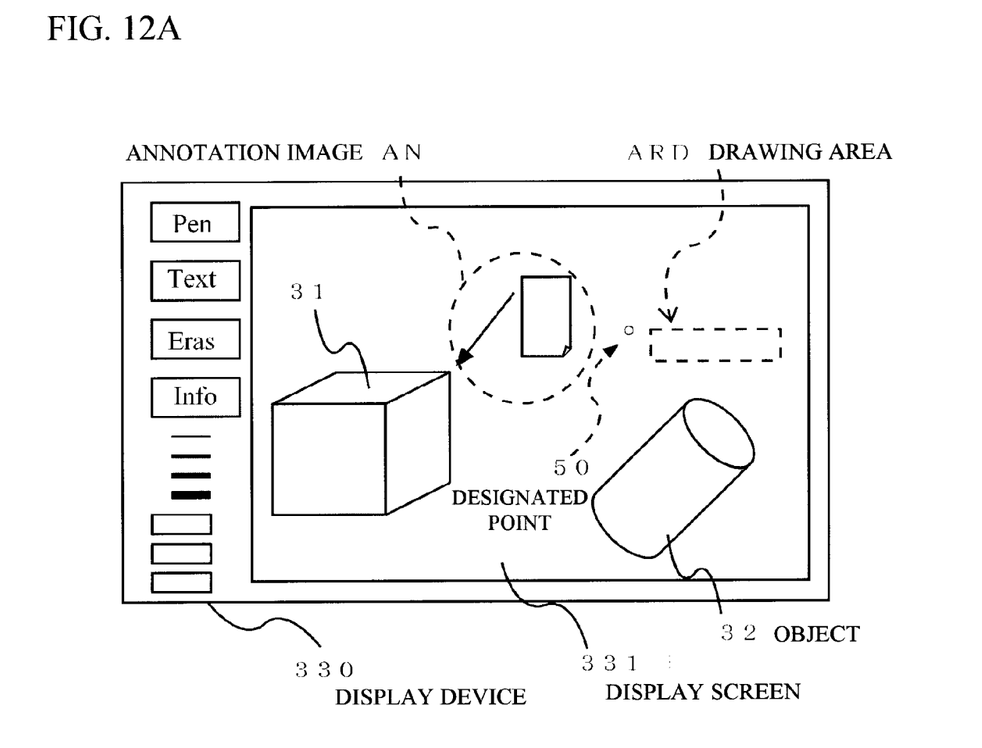
FIGS. 12A and 12B show an example of the drawing area displayed on the display device on the basis of the table information shown in FIG. 11.
Figure 12B:
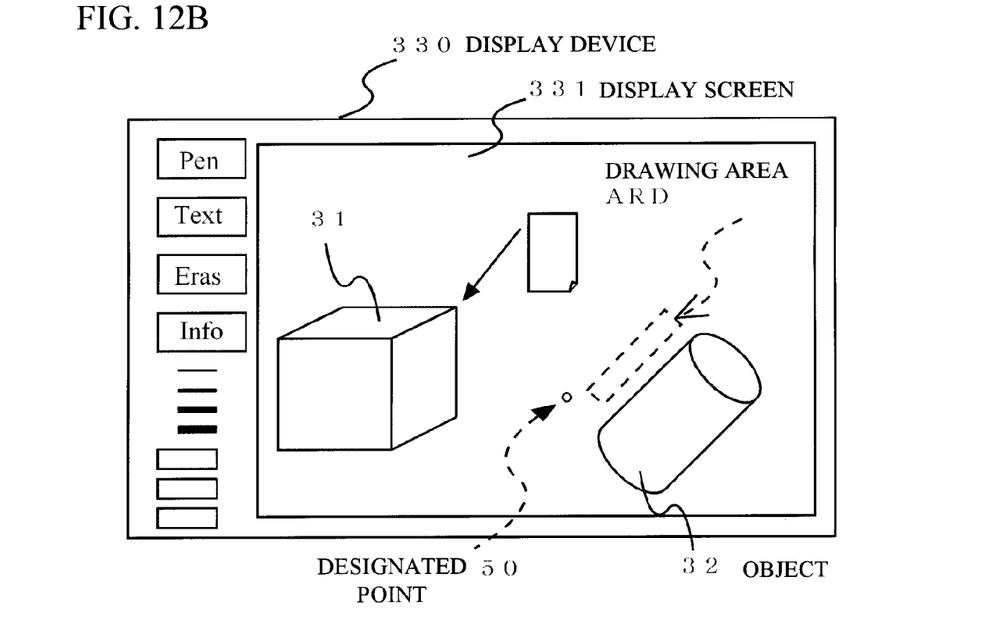

FIGS. 12A and 12B show example of drawing areas displayed on the display device 330, based on the table information shown in FIG. 11.

In FIG. 12A, the designated point 50 does not overlap any of the objects and the annotation image AN, and there is a wide background (a blank portion) around the designated point 50 (at a distance of 5 to 100 pixels to the right). Accordingly, a drawing area of 80 pixels in the horizontal direction and 14 pixels in the vertical direction is displayed. In this drawing area, characters of the size of point 12 can be written in the horizontal direction.

In FIG. 12B, the designated point 50 does not overlap the objects and the annotation image AN, but the object 32 exists in the vicinity of the designated point 50 (at a distance of 5 to 50 pixels to the right). Therefore, a drawing area of 12 pixels in the longitudinal direction and 40 pixels in the transverse direction is displayed. The drawing area has a rectangular shape that extends parallel to the outline of the object 32. In this drawing area, characters of the size of point 10 can be written in the direction parallel to the outline of the object 32.

As described above, then the writing position of a character annotation image is designated, the annotation adjusting unit 316 may have the function of recommending the character size or writing direction for the character annotation in accordance with the information as to the shape and arrangement of the objects and the information as to the background. Accordingly, the operation load for adjusting the size or the writing direction of the character annotation to be drawn as a character annotation image can be reduced, and a smooth remote instructing operation can be performed. Also, since the character size or the writing direction in accordance with the conditions of the objects and the background is recommended based on the table information, the character annotation becomes more clearly visible.

Further, when the writing position of an annotation image is designated, the annotation adjusting unit 316 may have the function of recommending the size or writing direction of the annotation image in accordance with the information as to the size and arrangement of the objects and the information as to the background. Accordingly, the operation load for adjusting the size or the writing direction of the annotation image can be reduced, and a smooth remote instructing operation can be performed.

It should be noted that the present invention is not limited to the above-described exemplary embodiment, but various modifications may be made to it without departing from the scope of the invention. For example, a program according to the present invention may be provided through a communication means, or may be stored in recording media such as CD-ROMs.

Although one server controls a video camera and a projector in the above-described exemplary embodiment, two or more servers may control a video camera and a projector, for example.

Further, in a case where the designated color of the characters in an annotation image or the like that is set beforehand in the remote instruction system is adjusted, the characters in the annotation image may be shaded so as to increase the visibility.

In a case where the character portion in an annotation image projected on an object is distorted as a result of an adjustment operation for enlarging the character annotation image, the distortion may be corrected through an affine transformation or the like. Further, it is possible to use a sensor or the like in place of the imaging unit, and the projection conditions may be adjusted in accordance with the condition in the detection range of the sensor.

If a function of the annotation adjusting unit 316 is not suited to a user, a switch for activating or stopping the function may be added to the annotation adjusting unit 316, so that the annotation adjusting unit 316 can be shared with another user who requires the function.

As described so far, in accordance with the present invention, an annotation image can be automatically adjusted, and advance settings for adjusting the conditions for displaying an annotation image are not necessary in a remote instruction system of the present invention. Thus, higher industrial applicability can be achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with various modifications as are suited to the particular use contemplated. It is intended that the scope of the invention be defined by the following claims and their equivalents.

What is claimed is:

1. A remote instruction system comprising:
an imaging unit that captures an image of a plurality of objects;
a projecting unit that projects an annotation image in an imaging area of the imaging unit, the annotation image being formed in accordance with an instruction issued based on the captured image; and
an annotation adjusting unit that adjusts conditions for projecting the annotation image, in accordance with a situation in the imaging area of the imaging unit,
wherein the annotation adjusting unit adjusts the projection conditions of the annotation image in accordance with a relationship between the annotation image and at least one of the objects, and the at least one of the objects is positioned in front of a display screen positioned within the imaging area.

2. The remote instruction system according to claim 1, wherein the relationship between the annotation image and the at least one of the objects involves at least one of position, size, color, and luminance.

3. The remote instruction system according to claim 1, wherein the annotation adjusting unit adjusts the projection conditions, based on a display position of the annotation image with respect to the at least one of the objects in the captured image.

4. The remote instruction system according to claim 1, wherein the annotation adjusting unit adjusts the projection conditions, so that the annotation image overlaps the at least one of the objects displayed in the captured image.

5. The remote instruction system according to claim 1, wherein, when the annotation image does not overlap the object in the captured image, the annotation adjusting unit adjusts the projection conditions, so that the annotation image is enlarged to such a size as not to overlap the at least one of the objects.

6. The remote instruction system according to claim 1, wherein, when the annotation image is contained in the object in the captured image, the annotation adjusting unit adjusts the projection conditions, so that the annotation image is enlarged to such a size as to be contained in the at least one of the objects.

7. The remote instruction system according to claim 1, wherein the annotation adjusting unit adjusts the projection conditions, so as to rotate the annotation image in accordance with an angle of the annotation image with respect to the at least one of the objects displayed in the captured image.

8. The remote instruction system according to claim 1, wherein the annotation adjusting unit adjusts the projection conditions for the color of the annotation image, in accordance with the color of the at least one of the objects overlapping the annotation image in the captured image.

9. The remote instruction system according to claim 1, further comprising:
a server that manages the imaging unit and the projecting unit; and
a remote terminal that receives the captured image from the server, includes the annotation adjusting unit, and transmits an adjusted annotation image to the server.

10. The remote instruction system according to claim 1, wherein the annotation adjusting unit is designed to be activated and stopped through an operation.

11. The remote instruction system according to claim 1, wherein the annotation adjusting unit includes a recommending unit that sets a recommended size or a recommended writing direction for the annotation image in accordance with information as to the shape and location of the at least one of the objects and information as to a background, when a writing position is designated for the annotation image.

12. The remote instruction system according to claim 11, wherein, when a writing position of a character annotation as the annotation image is designated, the recommending unit sets a recommended character size or a recommended writing direction for the character annotation in accordance with information as to the shape and location of the at least one of the objects and information as to the background.

13. The remote instruction system according to claim 12, wherein the annotation adjusting unit includes table information for defining the relationship among the writing position of the character annotation, the size and position of the drawing range of the character annotation, and the character size or the writing direction of the character annotation.

14. The remote instruction system according to claim 1, wherein only the annotation image is adjusted by the annotation adjusting unit.

15. The remote instruction system according to claim 1, wherein the annotation adjusting unit adjusts conditions for projecting the annotation image in response to the annotation image being generated.

16. A non transitory computer readable medium storing a program causing a computer to execute a process for a remote instruction system that includes an imaging unit capturing an image of a plurality of objects, and a projecting unit projecting an annotation image in an imaging area of the imaging unit, the process comprising:

adjusting conditions for projecting the annotation image, in accordance with a situation in the imaging area of the imaging unit,
wherein the projection conditions of the annotation image are adjusted in accordance with a relationship between the annotation image and at least one of the objects, and the at least one of the objects is positioned in front of a display screen positioned within the imaging area.

17. The process according to claim 16, wherein the annotation adjusting unit adjusts conditions for projecting the annotation image in response to the annotation image being generated.

18. A method comprising:
capturing an image of a plurality of objects by an imaging unit;
projecting an annotation image in an imaging area of the imaging unit; and
adjusting conditions for projecting the annotation image, in accordance with a situation in the imaging area of the imaging unit
wherein the projection conditions of the annotation image is adjusted in accordance with a relationship between the annotation image and at least one of the objects, and the at least one of the objects is positioned in front of a display screen positioned within the imaging area.

19. The method according to claim 18, wherein the annotation image is adjusted in response to the annotation image being generated.

* * * * *